United States Patent
Ishikawa et al.

(10) Patent No.: US 10,428,927 B2
(45) Date of Patent: Oct. 1, 2019

(54) VEHICLE CASING

(71) Applicant: TOYOTA JIDOSHA KABUSHIKI KAISHA, Toyota-shi, Aichi-ken (JP)

(72) Inventors: Satoru Ishikawa, Sunto-gun (JP); Akinori Goto, Sunto-gun (JP); Shingo Aijima, Susono (JP); Ayato Noumori, Okazaki (JP); Atsushi Honda, Seto (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/132,870

(22) Filed: Sep. 17, 2018

(65) Prior Publication Data
US 2019/0101205 A1 Apr. 4, 2019

(30) Foreign Application Priority Data
Sep. 29, 2017 (JP) .................................. 2017-190851

(51) Int. Cl.
| | | |
|---|---|---|
| *F16H 57/031* | (2012.01) | |
| *F16H 57/028* | (2012.01) | |
| *F16H 57/032* | (2012.01) | |
| *B60K 17/24* | (2006.01) | |
| *F16H 57/02* | (2012.01) | |

(52) U.S. Cl.
CPC ........... *F16H 57/031* (2013.01); *B60K 17/24* (2013.01); *F16H 57/028* (2013.01); *F16H 57/032* (2013.01); *F16H 2057/0203* (2013.01); *F16H 2057/02017* (2013.01); *F16H 2057/02043* (2013.01)

(58) Field of Classification Search
CPC .. B60K 7/0007; B60K 7/0038; B60K 7/0061; B60K 7/0092
USPC ................................ 180/312, 346, 378, 292
See application file for complete search history.

(56) References Cited

U.S. PATENT DOCUMENTS

| | | | | |
|---|---|---|---|---|
| 4,631,977 A | * | 12/1986 | Kawashima | ............. B62M 9/06 474/150 |
| 4,736,809 A | * | 4/1988 | Kumazawa | ............ B60K 17/08 180/292 |
| 5,014,800 A | * | 5/1991 | Kawamoto | .......... B60K 7/0007 180/65.51 |
| 5,087,229 A | * | 2/1992 | Hewko | ................ B60K 7/0007 180/65.51 |

(Continued)

FOREIGN PATENT DOCUMENTS

| | | |
|---|---|---|
| CN | 204226620 U | 3/2015 |
| DE | 102 49 175 A1 | 7/2003 |

(Continued)

*Primary Examiner* — Jeffrey J Restifo
(74) *Attorney, Agent, or Firm* — Oliff PLC

(57) ABSTRACT

A vehicle casing includes a metal frame and a resin cover that covers the metal frame. The resin cover accommodates vehicle components inside the metal frame. The metal frame includes a bearing supporting boss portion that rotatably supports, inside the resin cover, a shaft member that is one of the vehicle components and rotates about a shaft center, and a mount boss portion that is for fixing the vehicle casing to a vehicle body. The bearing supporting boss portion is disposed at a position separate from an inner surface of the resin cover. The resin cover is disposed to cover the entire metal frame except a portion provided with the mount boss portion.

4 Claims, 3 Drawing Sheets

(56) References Cited

U.S. PATENT DOCUMENTS

| | | | | |
|---|---|---|---|---|
| 5,163,528 A * | 11/1992 | Kawamoto | ......... | B60K 7/0007 180/65.51 |
| 5,691,584 A * | 11/1997 | Toida | ................ | B60K 7/0007 180/65.51 |
| 5,699,869 A * | 12/1997 | Fritzinger | ............ | A63H 31/00 180/65.51 |
| D412,466 S * | 8/1999 | Jones | ........................... | D12/126 |
| 6,269,899 B1 * | 8/2001 | Izumi | ...................... | B60K 5/04 180/233 |
| 6,398,683 B1 * | 6/2002 | Fukuda | .................. | B62J 13/00 180/219 |
| 6,547,023 B2 * | 4/2003 | Laimbock | ............. | B62K 11/04 180/227 |
| 6,941,920 B1 * | 9/2005 | Thurm | .................... | B62J 23/00 123/195 C |
| 7,249,644 B2 * | 7/2007 | Honda | .................... | B60K 1/00 180/22 |
| 7,377,598 B2 * | 5/2008 | Doud | .................. | B60B 35/003 180/378 |
| 7,464,685 B2 * | 12/2008 | Hochmayr | ............ | F02F 7/0053 123/195 R |
| 7,472,768 B2 * | 1/2009 | Denner | .................... | B60K 6/40 180/65.1 |
| 7,581,467 B2 * | 9/2009 | Peterman | ............... | F16H 63/18 74/473.37 |
| 7,735,589 B2 * | 6/2010 | Sugiyama | ............ | B60K 7/0007 180/55 |
| 7,975,789 B2 * | 7/2011 | Murata | ................ | B60G 7/005 180/65.51 |
| 8,157,038 B2 * | 4/2012 | Ishida | ..................... | B62J 17/06 180/68.1 |
| 8,267,214 B2 * | 9/2012 | Arnold | ................... | B62M 7/02 180/219 |
| 8,302,752 B2 * | 11/2012 | Gokan | ................... | F16D 13/04 192/54.5 |
| 8,348,005 B2 * | 1/2013 | Hanawa | .................. | B60K 6/40 180/291 |
| 8,776,937 B2 * | 7/2014 | Kim | ........................ | B60K 5/12 180/292 |
| 8,783,405 B2 * | 7/2014 | Irie | ....................... | B62K 11/04 180/220 |
| 8,813,891 B2 * | 8/2014 | Tsukamoto | ............. | B62M 7/12 180/220 |
| 9,033,838 B2 * | 5/2015 | Kluge | .................. | F16H 57/035 180/65.51 |
| 9,194,278 B2 * | 11/2015 | Fronk | ...................... | F01P 5/12 |
| 9,260,153 B2 * | 2/2016 | Theobald | ............... | B62K 11/04 |
| 9,605,745 B1 * | 3/2017 | Burns | ................... | F16H 57/031 |
| 9,735,648 B2 * | 8/2017 | Suzuki | ................. | H02K 5/1732 |
| 2003/0154811 A1 | 8/2003 | Hattori et al. | | |
| 2013/0057048 A1 * | 3/2013 | Ishikawa | ............. | B60K 7/0007 301/6.5 |

FOREIGN PATENT DOCUMENTS

| | | |
|---|---|---|
| EP | 2 006 120 A2 | 12/2008 |
| JP | 2000-018348 A | 1/2000 |
| JP | 2011-240765 A | 12/2011 |
| JP | 2012-197918 A | 10/2012 |
| JP | 2013-137097 A | 7/2013 |
| JP | 2016-033374 A | 10/2016 |

* cited by examiner

VEHICLE INNER SIDE ←→ VEHICLE OUTER SIDE

VEHICLE CASING

INCORPORATION BY REFERENCE

The disclosure of Japanese Patent Application No. 2017-190851 filed on Sep. 29, 2017 including the specification, drawings and abstract is incorporated herein by reference in its entirety.

BACKGROUND

1. Technical Field

The present disclosure relates to a vehicle casing which accommodates a component of a vehicle.

2. Description of Related Art

As a vehicle casing, for example, Japanese Unexamined Patent Application Publication No. 2012-197918 (JP 2012-197918 A) discloses a transmission case rear cover that has a composite structure provided with a metal frame and a resin cover. With the transmission case rear cover as described above, it is possible to achieve reduction in weight of a transmission by replacing a transmission case rear cover in the related art, which is formed of metal, with a resin cover.

SUMMARY

However, in the case of a transmission case rear cover 101 disclosed in JP 2012-197918 A (which is shown in FIG. 8), a metal frame 110 and a bearing supporting boss portion 113 connected to the metal frame 110 are in close contact with an inner surface 120a of a resin cover 120. Therefore, there is a possibility that vibration (for example, gear noise) from a vehicle component such as a gear or the like in a transmission is transmitted to, for example, the resin cover 120 via a shaft member 131 that rotates in the transmission case, a bearing 132, and the bearing supporting boss portion 113 and a vibration sound is radiated into a vehicle.

The present disclosure provides a vehicle casing with which it is possible to improve quietness of a vehicle by suppressing radiation of a vibration sound from a component of the vehicle.

An aspect of the present disclosure relates to a vehicle casing includes a metal frame and a resin cover that covers the metal frame. The resin cover accommodates vehicle components inside the metal frame. The metal frame includes a bearing supporting boss portion that rotatably supports, inside the resin cover, a shaft member that is one of the vehicle components and rotates about a shaft center, and a mount boss portion that is for fixing the vehicle casing to a vehicle body. The bearing supporting boss portion is disposed at a position separate from an inner surface of the resin cover. The resin cover is disposed to cover the entire metal frame except a portion provided with the mount boss portion.

In the case of the vehicle casing according to the aspect of the present disclosure, since the bearing supporting boss portion is disposed at a position separate from the inner surface of the resin cover, vibration from the vehicle components is restrained from being transmitted to the resin cover via the bearing supporting boss portion.

In the vehicle casing according to the aspect of the present disclosure, the metal frame may include an arm portion connected to the bearing supporting boss portion that supports a primary shaft as the shaft member. The arm portion may be connected to the mount boss portion. The mount boss portion may be provided in the arm portion connected to the bearing supporting boss portion. The resin cover may be fixed to the arm portion connected to the mount boss portion.

In the case of the vehicle casing according to the aspect of the present disclosure, the metal frame may be formed to have a hollow section, and oil can flow through the metal frame. Therefore, a space for an oil path can be omitted and thus reduction in size can be achieved.

In the vehicle casing according to the aspect of the present disclosure, the vehicle casing may be a motor cover that accommodates a motor of an in-wheel motor. The resin cover may be provided inward of a vehicle compared with a wheel hub connected to a wheel of the in-wheel motor.

In the case of the vehicle casing according to the aspect of the present disclosure, since the bearing supporting boss portion of the motor cover for the in-wheel motor disposed at a position separate from the inner surface of the resin cover, a vibration sound can be restrained from being radiated into the vehicle.

According to the aspect of the present disclosure, vibration from vehicle components is not transmitted to a resin cover. Therefore, a vibration sound is restrained from being radiated into a vehicle and quietness of the vehicle is improved.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

A vehicle casing according to an embodiment of the present disclosure will be described with reference to the drawings. The present disclosure is not limited to the following embodiment. Constituent elements in the following embodiment include constituent elements which can be easily replaced by those skilled in the art and constituent elements which are substantially the same as those in the following embodiment.

First Embodiment

Figure 1:
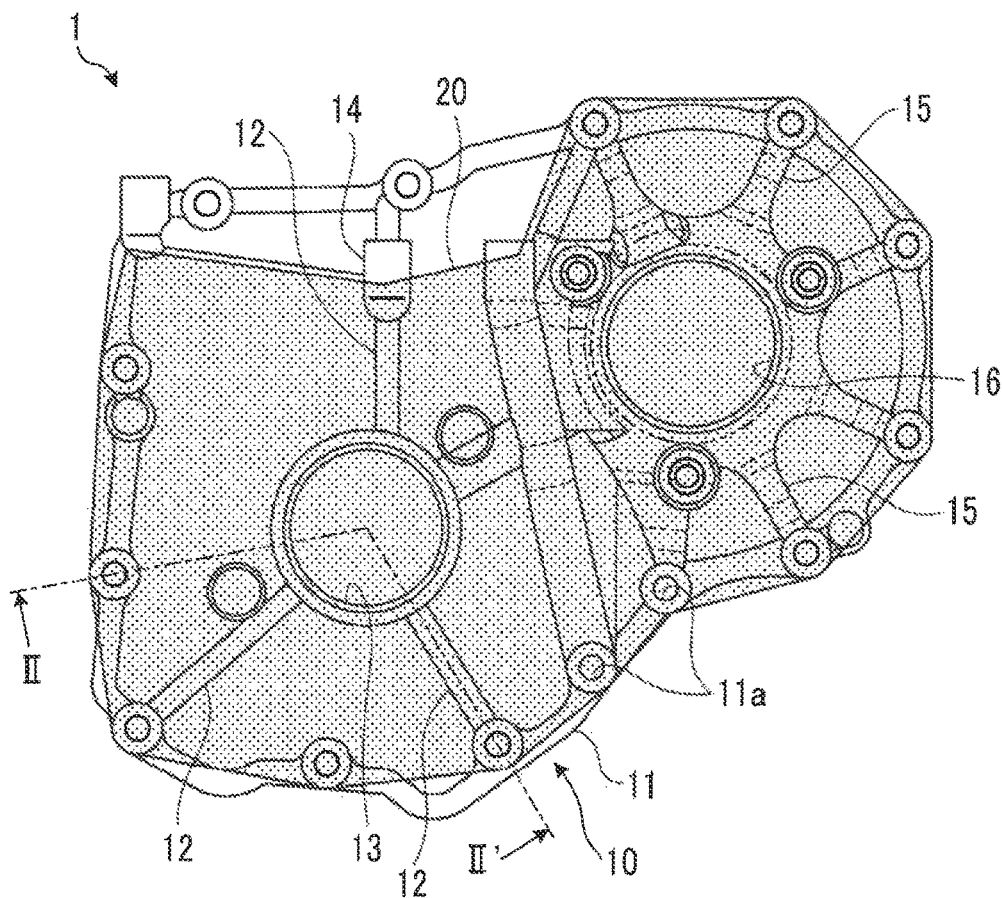
FIG. 1 is a front view illustrating an example in which a vehicle casing according to a First embodiment of the present disclosure is applied to a transmission rear cover.
Figure 2:
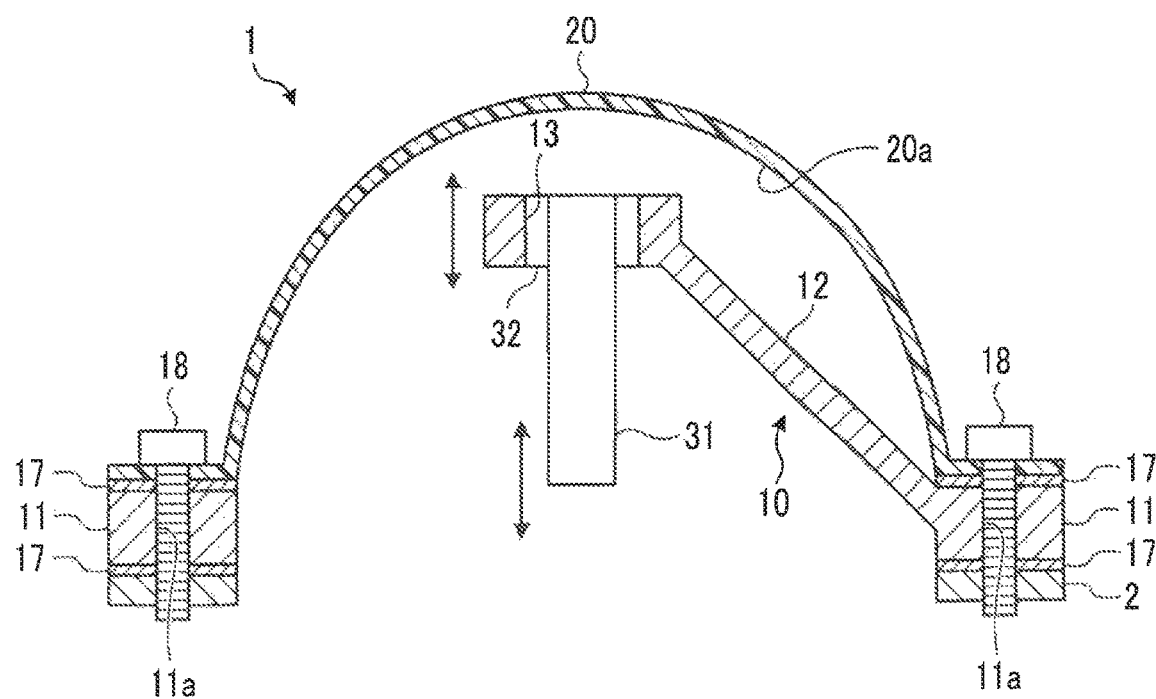
FIG. 2 is a sectional view taken along line II-II' in FIG. 1.

A vehicle casing according to a First embodiment of the present disclosure will be described with reference to FIGS. 1 to 5B. FIG. 1 illustrates an example in which the vehicle casing according to the First embodiment is applied to a transmission case rear cover 1 of a belt-type continuously variable transmission, for example. FIG. 2 is a simplified sectional view of the transmission case rear cover 1 in FIG. 1 which is taken along line II-II'.

The transmission case rear cover (hereinafter, referred to as rear cover) 1 is for accommodating components of a vehicle and has a composite structure provided with a metal frame 10 and a resin cover 20 that covers the metal frame 10. In the First embodiment, the components of the vehicle include a shaft member 31 that rotates about a shaft center, a bearing 32, or the like shown in FIG. 2, for example. Specifically, the shaft member 31 is a primary shaft of a transmission. As illustrated in FIG. 2, the rear cover 1 accommodates the shaft member 31 and the bearing 32, which are components of the vehicle, inside the metal frame 10.

The metal frame 10 is configured through, for example, aluminum die-casting (of ADC 12 or like) and is molded through casting. The metal frame 10 is disposed inside the resin cover 20. The metal frame 10 is provided with a flange portion 11 that forms the outer shape of the rear cover 1, a plurality of arm portions 12, a bearing supporting boss portion 13, a mount boss portion 14, a plurality of arm portions 15, and a bearing supporting boss portion 16.

In the flange portion 11, a plurality of bolt holes 11a is formed over the entire circumference. In addition, as illustrated in FIG. 2, the flange portion 11 is connected to the resin cover 20 and a center case 2 of a transmission case via gaskets 17, by means of the bolts 18. That is, the metal frame 10 is flange-coupled with the resin cover 20 and the center case 2.

The arm portions 12 are for supporting the bearing supporting boss portion 13 and are provided between the flange portion 11 and the bearing supporting boss portion 13. As illustrated in FIG. 2, the arm portions 12 are disposed to be separate from an inner surface 20a of the resin cover 20. That is, the arm portions 12 support the bearing supporting boss portion 13 without being in contact with the resin cover 20.

Figure 3A:
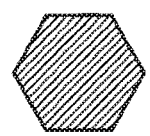
FIG. 3A is a sectional view illustrating a metal frame of the vehicle casing according to the First embodiment of the present disclosure that has a solid section.
Figure 3B:
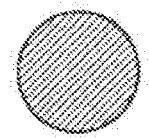
FIG. 3B is a sectional view illustrating a metal frame of the vehicle casing according to the First embodiment of the present disclosure that has a solid section.
Figure 4A:
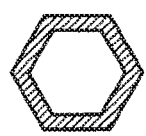
FIG. 4A is a sectional view illustrating a metal frame of the vehicle casing according to the First embodiment of the present disclosure that has a hollow section.
Figure 4B:
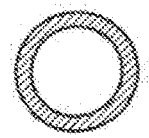
FIG. 4B is a sectional view illustrating a metal frame of the vehicle casing according to the First embodiment of the present disclosure that has a hollow section.
Figure 5A:
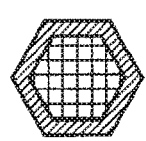
FIG. 5A is a sectional view illustrating a metal frame of the vehicle casing according to the First embodiment of the present disclosure that has a grid-shaped section.
Figure 5B:
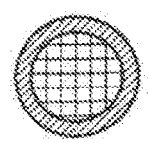
FIG. 5B is a sectional view illustrating a metal frame of the vehicle casing according to the First embodiment of the present disclosure that has a grid-shaped section.

Here, as illustrated in FIG. 3A, a section of the arm portion 12 has, a hexagonal columnar shape, for example. Instead of the arm portions 12, arm portions 12A, 12B, 12C, 12D, 12E as illustrated in FIGS. 3B, 4A, 4B, 5A, and 5B may be used.

A section of the arm portion 12A has a circular columnar shape. A section of the arm portion 12B has a ring-like hexagonal shape. A section of the arm portion 12C has an annular shape. A section of the arm portion 12D has a ring-like hexagonal shape and a hollow portion of the arm portion 12D is provided with a partition that has a grid-shaped section and that extends in a longitudinal direction. A section of the arm portion 12E has an annular shape and a hollow portion of the arm portion 12E is provided with a partition that has a grid-shaped section and that extends in the longitudinal direction.

In a case where the arm portion has a hollow section or a grid-shaped section like the arm portions 12B, 12C, 12D, 12E illustrated in FIGS. 4A, 4B, 5A, and 5B, oil can flow through the arm portions 12B, 12C, 12D, 12E. Accordingly, the metal frame 10 and an oil path can be the same element. Therefore, a space for the oil path can be omitted and thus reduction in size and weight of the rear cover 1 can be achieved.

Referring again to FIG. 2, the remaining part of a configuration of the rear cover 1 will be described. The bearing supporting boss portion 13 is for supporting the shaft member 31 via the bearing 32 such that the shaft member 31 rotates. The bearing 32 is fixed to the bearing supporting boss portion 13 via a bolt (not shown). As illustrated in FIG. 2, the bearing supporting boss portion 13 is not in contact with the resin cover 20 and is disposed to be separate from the inner surface 20a of the resin cover 20. The mount boss portion 14 is for fixing a mount member or the like (not shown) that is for attaching the transmission case to a vehicle body.

The arm portions 15 are for supporting the bearing supporting boss portion 16 and are provided between the flange portion 11 and the bearing supporting boss portion 16. The bearing supporting boss portion 16 is for supporting a shaft member (not shown) (specifically, secondary shaft of transmission) via a bearing (not shown) such that the shaft member rotates. A larger load than that applied to the primary shaft is applied to the secondary shaft of the transmission since a meshing reaction force from a reduction gear or the like acts on the secondary shaft in addition to a tensile force of a belt in the transmission. Therefore, the bearing supporting boss portion 16 and the arm portions 15 which support the secondary shaft may be reinforced to be thicker than the bearing supporting boss portion 13 and the arm portions 12.

The resin cover 20 is formed of, for example, glass-fiber reinforced resin (GF reinforced PA 66 or like) which is heat-resistant and oil-resistant and the resin cover 20 is molded through injection molding. The resin cover 20 is disposed outward of the metal frame 10. The resin cover 20 is disposed to cover the entire metal frame 10 except a portion provided with the mount boss portion 14.

With the rear cover 1 configured as described above, it is possible to achieve reduction in weight since the rear cover has a composite structure provided with the metal frame 10 and the resin cover 20 and it is possible to achieve an effect of improving fuel efficiency at the time of installation in a vehicle. Since the bearing supporting boss portion 13 of the rear cover 1 is not in close contact with the inner surface 20a of the resin cover 20, vibration (for example, gear noise) from a vehicle component such as a gear in a transmission case is restrained from being transmitted to the resin cover 20 via the bearing supporting boss portion 13. Therefore, a vibration sound is restrained from being radiated into the vehicle and quietness of the vehicle is improved.

Second Embodiment

Figure 6:
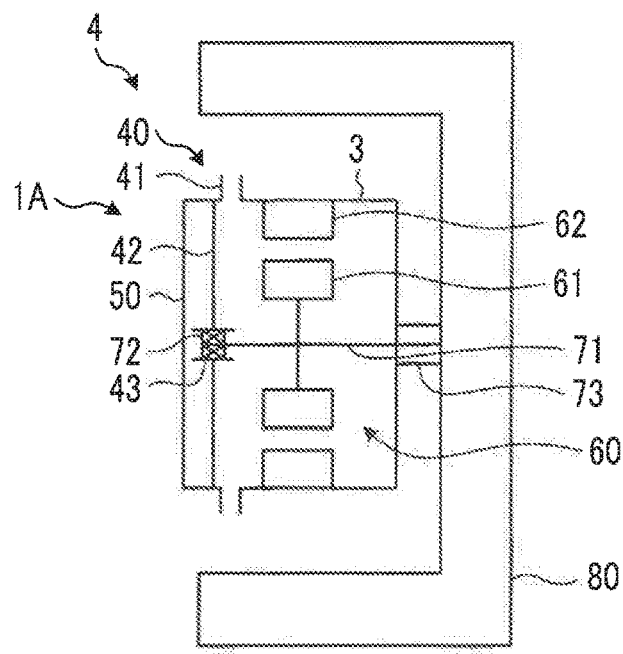
FIG. 6 is a skeleton diagram illustrating a configuration of a main part of an in-wheel motor provided with a vehicle casing according to a Second embodiment of the present disclosure.
Figure 7:
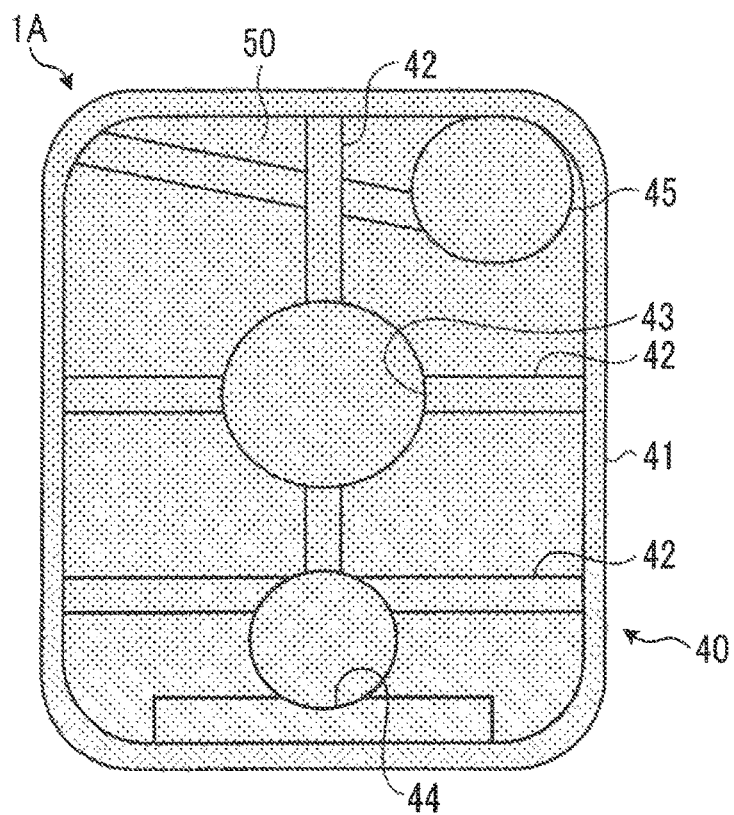
FIG. 7 is a front view illustrating an example in which the vehicle casing according to the Second embodiment of the present disclosure is applied to a motor cover of the in-wheel motor.
Figure 8:
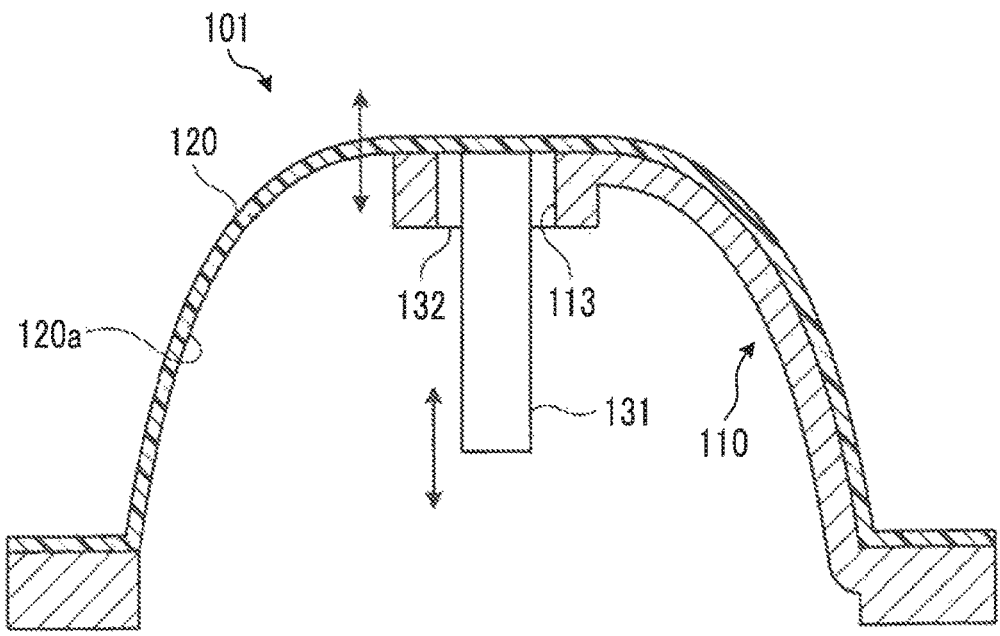
FIG. 8 is a sectional view illustrating a transmission case rear cover according to the related art.

A vehicle casing according to a Second embodiment of the present disclosure will be described with reference to FIGS. 6 and 7. FIG. 6 is a simplified view illustrating a configuration of an in-wheel motor 4. FIG. 7 illustrates an example in which the vehicle casing according to the Second embodiment is applied to a motor cover 1A of the in-wheel motor 4.

As illustrated in FIG. 6, the in-wheel motor 4 is provided with the motor cover 1A, a motor housing 3, a motor 60, a shaft member 71, a bearing 72, and a wheel hub 73. The motor cover 1A and the motor housing 3 are accommodated in a wheel 80, the motor 60 is accommodated inside the motor cover 1A the motor housing 3, the shaft member 71 is connected to the motor 60, and the wheel hub 73 is connected to the wheel 80. The motor 60 is provided with a rotor 61 that is connected to the shaft member 71 and a stator 62.

As illustrated in FIG. 7, the motor cover 1A has a composite structure provided with a metal frame 40 and a resin cover 50 that covers the metal frame 40. In the Second embodiment, the components of the vehicle include the motor 60, the shaft member 71 that rotates about a shaft center, the bearing 72, or the like shown in FIG. 6, for example. Specifically, the shaft member 71 is an input shaft of the motor 60 and is a member corresponding to the shaft member 31 (refer to FIG. 2) in the First embodiment. As illustrated in FIG. 6, the motor cover 1A accommodates the shaft member 71 and the bearing 72, which are components of the vehicle, inside the metal frame 40.

The metal frame 40 is configured through, for example, aluminum die-casting (of ADC 12 or like) and is molded through casting. The metal frame 40 is disposed inside the resin cover 50. The metal frame 40 is provided with a flange portion 41 that forms the outer shape of the motor cover 1A, a plurality of arm portions 42, a bearing supporting boss portion 43, an oil pump boss portion 44 that supports an oil pump (not shown), and a valve body 45.

The flange portion 41 is connected to the resin cover 50 and the motor housing 3 by means of a bolt (not shown). That is, the metal frame 40 is flange-coupled to the resin cover 50 and the motor housing 3.

The arm portions 42 are for supporting the bearing supporting boss portion 43 and are provided between the flange portion 41 and the bearing supporting boss portion 43. As with the First embodiment (refer to FIG. 2), the arm portions 42 are disposed to be separate from an inner surface of the resin cover 50. That is, the arm portions 42 support the bearing supporting boss portion 43 without being in contact with the resin cover 50.

A section of the arm portion 42 may have any of a hexagonal columnar shape, a circular columnar shape, a ring-like hexagonal shape, an annular shape, a ring-like hexagonal shape with a grid pattern, and an annular shape with a grid pattern as illustrated in FIGS. 3A to 5B.

The bearing supporting boss portion 43 is for supporting the shaft member 71 via the bearing 72 such that the shaft member 71 rotates. The bearing 72 is fixed to the bearing supporting boss portion 43 via a bolt (not shown). As with the First embodiment (refer to FIG. 2), the bearing supporting boss portion 43 is not in contact with the resin cover 50 and is disposed to be separate from the inner surface of the resin cover 50.

The resin cover 50 is formed of, for example, glass-fiber reinforced resin (GF reinforced PA 66 or like) which is heat-resistant and oil-resistant and the resin cover 50 is molded through injection molding. The resin cover 50 is disposed outward of the metal frame 40. The resin cover 50 is disposed to cover the entire metal frame 40. As illustrated in FIG. 6, the resin cover 50 is provided inward of the wheel hub 73 of the in-wheel motor 4 in a vehicle width direction when the in-wheel motor 4 is attached to the vehicle, the wheel hub 73 being connected to the wheel 80 of the vehicle.

With the motor cover 1A configured as described above, it is possible to achieve reduction in weight since the motor cover has a composite structure provided with the metal frame 40 and the resin cover 50 and it is possible to achieve an effect of improving fuel efficiency at the time of installation in a vehicle. Since the bearing supporting boss portion 43 of the motor cover 1A is not in close contact with the inner surface of the resin cover 50 provided inward of the bearing supporting boss portion 43 in the vehicle width direction, vibration (for example, gear noise) from a vehicle component such as a gear in the motor cover 1A is restrained from being transmitted to the resin cover 50 via the bearing supporting boss portion 43. Therefore, a vibration sound is restrained from being radiated into the vehicle and quietness of the vehicle is improved.

Hereinabove, the vehicle casing according to the embodiments of the present disclosure has been specifically described. However, the gist of the present disclosure is not limited by the description in the present specification and has to be widely interpreted based on the description of claims. It is a matter of course that those obtained by various modifications and changes based on the description in the present specification are also included in the gist of the present disclosure.

For example, in the First embodiment, the bearing supporting boss portion 13, which supports the primary shaft (shaft member 31) of the transmission such that the primary shaft rotates and is one of two bearing supporting boss portions 13, 16, is disposed to be separate from the inner surface 20a of the resin cover 20. However, the bearing supporting boss portion 16 which supports the secondary shaft of the transmission such that the secondary shaft rotates may also be disposed to be separate from the inner surface 20a of the resin cover 20.

In the First embodiment, the arm portions 12 are not in close contact with the resin cover 20. However, in a case where the bearing supporting boss portion 13 is not in close contact with the resin cover 20 as illustrated in FIG. 2, the arm portions 12 may be in close contact with the resin cover 20.

What is claimed is:
1. A vehicle casing comprising:
a metal frame; and
a resin cover covering the metal frame, the resin cover accommodating a plurality of vehicle components inside the metal frame,
the metal frame including:
a bearing supporting boss portion rotatably supporting a shaft member inside the resin cover, the shaft member being one of the plurality of vehicle components and configured to rotate about a shaft center,
an arm portion connected to the bearing supporting boss portion, the arm portion being separated from an inner surface of the resin cover, and the arm portion extending straight from a flange portion of the metal frame to the bearing supporting boss portion, and
a mount boss portion configured to fix the vehicle casing to a vehicle body, wherein:
the bearing supporting boss portion is separated from the inner surface of the resin cover, and
the resin cover is disposed so as to cover all of the metal frame except a portion provided with the mount boss portion.

2. The vehicle casing according to claim 1, wherein:
the bearing supporting boss portion supports a primary shaft as the shaft member;
the arm portion is connected to the mount boss portion;
the mount boss portion is provided in the arm portion connected to the bearing supporting boss portion; and
the resin cover is fixed to the arm portion connected to the mount boss portion.

3. The vehicle casing according to claim 1, wherein the metal frame is formed to have a hollow section configured to allow oil to flow through the metal frame.

4. The vehicle casing according to claim 1, wherein:
the vehicle casing is a motor cover configured to accommodate a motor of an in-wheel motor; and
the resin cover is configured to be disposed on an interior side of a vehicle with respect to a wheel hub connected to a wheel of the in-wheel motor.

* * * * *